US012382202B2

(12) United States Patent
Xie (10) Patent No.: US 12,382,202 B2
(45) Date of Patent: Aug. 5, 2025

(54) SERVICE MANAGEMENT METHOD AND APPARATUS FOR PASSIVE OPTICAL NETWORK, OPTICAL LINE TERMINAL AND MEDIUM (71) Applicant: ZTE CORPORATION, Shenzhen (CN)

(72) Inventor: Yu Xie, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 175 days.

(21) Appl. No.: 18/044,898

(22) PCT Filed: Sep. 14, 2021

(86) PCT No.: PCT/CN2021/118258
§ 371 (c)(1),
(2) Date: Mar. 10, 2023

(87) PCT Pub. No.: WO2022/053063
PCT Pub. Date: Mar. 17, 2022

(65) Prior Publication Data
US 2023/0379606 A1 Nov. 23, 2023

(30) Foreign Application Priority Data
Sep. 14, 2020 (CN) .................. 202010962900.X (51) Int. Cl.
H04Q 11/00 (2006.01)
(52) U.S. Cl.
CPC . *H04Q 11/0062* (2013.01); *H04Q 2011/0083* (2013.01)
(58) Field of Classification Search
CPC ............. H04Q 11/00; H04Q 11/0062; H04Q 11/0067; H04Q 2011/0064; H04Q 2011/0081; H04Q 2011/0083
See application file for complete search history.

(56) References Cited

U.S. PATENT DOCUMENTS

| 2011/0317995 | A1* | 12/2011 | Zheng | ................ H04L 41/0663 398/2 |
| 2013/0101283 | A1* | 4/2013 | Zheng | ................ H04B 10/272 398/2 |
| 2016/0006631 | A1* | 1/2016 | Qin | ........................ H04L 41/04 398/25 |

FOREIGN PATENT DOCUMENTS

| CN | 108235157 A | 6/2018 |
| CN | 108809672 A | 11/2018 |

(Continued)

OTHER PUBLICATIONS

International Searching Authority. International Search Report and Written Opinion for PCT Application No. PCT/CN2021/118258 and English translation, mailed Nov. 30, 2021, pp. 1-9.

(Continued)

*Primary Examiner* — Pranesh K Barua
(74) *Attorney, Agent, or Firm* — Vivacqua Crane, PLLC (57) ABSTRACT A service management method and apparatus for a passive optical network, an optical line terminal and a medium are disclosed. The method may include, maintaining communication with the OLT; acquiring optical network unit management control interface (OMCI) frame data transferred via the OLT; acquiring service information of the ONU according to the OMCI frame data; and performing the service management to the passive optical fiber network according to a network connection status between the OLT and the OMCI VNF, and service information of the ONU.

18 Claims, 5 Drawing Sheets (56) References Cited

FOREIGN PATENT DOCUMENTS

| CN | 108989912 A |   | 12/2018 |   |          |
|----|-------------|---|---------|---|----------|
| CN | 110391921 A |   | 10/2019 |   |          |
| CN | 111083576 A |   | 4/2020  |   |          |
| CN | 113938768   | * | 1/2022  |   |          |
| EP | 3618351 A1  |   | 3/2020  |   |          |
| EP | 3869768 A1  | * | 8/2021  | ............. | H04J 14/00 |
| WO | 2017177619 A1 |   | 10/2017 |   |          |

OTHER PUBLICATIONS

European Patent Office. Extended European Search Report for EP Application No. 21866115.5, mailed Feb. 8, 2024, pp. 1-9.
The State Intellectual Property Office of People's Republic of China. First Office Action and Search Report for CN Application No. 202010962900.X and English translation, mailed May 29, 2025, pp. 1-12.

* cited by examiner

SERVICE MANAGEMENT METHOD AND APPARATUS FOR PASSIVE OPTICAL NETWORK, OPTICAL LINE TERMINAL AND MEDIUM

CROSS-REFERENCE TO RELATED APPLICATION

This application is a national stage filing under 35 U.S.C. § 371 of international application number PCT/CN2021/118258, filed Sep. 14, 2021, which claims priority to Chinese patent application No. 202010962900.X, filed Sep. 14, 2020. The contents of these applications are incorporated herein by reference in their entirety.

TECHNICAL FIELD

The present disclosure relates to a passive optical fiber network, and in particular to a method and a device for service management of a passive optical fiber network, an optical line terminal, and a storage medium.

BACKGROUND

With the development of network function virtualization technology, the network functions in optical line terminal (OLT) are replaced by externally and independently deployed virtualized network functions (VNF). OMCI (optical network unit management and control interface), as the network function of managing ONU(s) connected with an OLT, is selected as the VNF to manage the ONU(s) and becomes an OMCI for realizing virtualization network function (OMCI VNF).

The deployed OMCI VNF can bring many advantages to ONU management. However, the connection between the OMCI VNF and the OLT may be disconnected since the connection is a remote connection. When the connection between the OMCI VNF and the OLT is disconnected, a failure of the service of the ONU occurs. And when the connection between the OMCI VNF and the OLT returns to normal from disconnection, the OMCI VNF performs synchronizations according to the latest service information of the ONU(s), in order to update the service status of the ONU, which will interfere with the normal service of the ONU(s) and also lead to a failure in service of the passive optical network.

SUMMARY

Provided are a method and a device for service management of a passive optical fiber network, an optical line terminal, and a storage medium in some embodiments of the present disclosure.

An embodiment of the present disclosure provides a method for service management of a passive optical fiber network including an optical line terminal (OLT), an optical network unit (ONU), and an optical network unit management control interface for realizing a virtualization network function (OMCI VNF), the method may include, maintaining communication with the OLT; acquiring optical network unit management control interface (OMCI) frame data transferred via the OLT; acquiring service information of the ONU according to the OMCI frame data; and performing the service management to the passive optical fiber network according to a network connection status between the OLT and the OMCI VNF, and service information of the ONU.

An embodiment of the present disclosure provides a device for service management of a passive optical fiber network, the device may include, a communication module configured to maintain communication with an optical line terminal (OLT); a listening module configured to acquire optical network unit management control interface (OMCI) frame data transferred via the OLT, and acquire service information of an optical network unit (ONU) according to the OMCI frame data; and a service management module configured to perform service management to the passive optical fiber network according to a network connection status between the OLT and an optical network unit management control interface for realizing a virtualization network function (OMCI VNF), and service information of the ONU.

An embodiment of the present disclosure provides an optical line terminal (OLT), which may include the device as described above.

An embodiment of the present disclosure provides a computer-readable storage medium storing thereon at least one program executable by at least one processor which, when executed by the processor, causes the processor to carry out the method as described above.

Other features and advantages of the present disclosure will be illustrated in the following description, and in part will be apparent from the description, or may be understood by practicing the present disclosure. The objects and other advantages of the present disclosure can be achieved and obtained by the structure particularly set forth in the description, claims and drawings.

DETAILED DESCRIPTION

The purpose, technical scheme and advantages of the present disclosure will become apparent through the following description for various embodiments in conjunction with the drawings. It should be understood that the embodiments described here are intended for illustration but not limitation of the present disclosure.

It should be noted that although the devices are shown with individual functional modules in the schematic diagram and the logical sequences are shown in the flow chart, in some cases, the devices can have different modules than those shown and the steps can be executed in a different order than those shown. It should be noted that the terms "first" and "second", if used in the description and the drawings are intended to distinguish similar objects, and do not necessarily imply any specific order or sequence.

In the description of various embodiments of the present disclosure, the terms such as provide, mount or connect should be broadly understood, unless otherwise specified, and those having ordinary skills in the art can reasonably determine the specific meanings of the above terms in various embodiments of the present disclosure in conjunction with the specific contents of the technical scheme.

Network function virtualization (NFV) utilizes general-purpose IT software and hardware, and virtualization technology to realize the network functions originally provided by professional network equipment with software, which can not only reduce the network cost but also flexibly expand the network functions. NFV realizes the communication network function by decoupling the software and hardware of professional communication equipment and abstracting the functions, and based on general computing, storage and network equipment by means of software. Thereby, the network equipment function no longer relies on special hardware, resources can be fully and flexibly shared, and new services can be rapidly developed and deployed, and automatic deployment, flexible expansion and contraction, fault isolation and self-healing can be carried out based on actual service requirements.

Based on the development of the passive optical fiber network, operators gradually replace the network function in the optical line terminal (OLT) with the externally independently deployed virtualized network function (VNF), forming an optical network unit management control interface (OMCI VNF) for realizing the virtualized network function. However, disconnection between the OMCI VNF and the OLT may occur since they are remotely connected via the network. Once the disconnection of the network between OMCI VNF and OLT occurs, the ONU connected to the OLT will lose its manager, resulting in service failure. And when the connection between OMCI VNF and OLT recovers, the OMCI VNF performs synchronization with each ONU connected to the OLT in order to update the operating state of the respective ONU, which may interfere with the normal service of the ONU(s).

In view of this, a method and device for service management of a passive optical fiber network, an optical line terminal, and a storage medium are provided in some embodiments of the present disclosure. By means of some embodiments of the present disclosure, the communication with the OLT is maintained, the OMCI frame data transmitted through the OLT is acquired, the service information of the ONU is acquired according to the OMCI frame data, and the service management of passive optical fiber network is performed according to the network connection status of the OLT and the service information of the ONU. The proper services of the ONU can be maintained by temporarily taking over the tasks of the OMCI VNF or the ONU, when a network disconnection between the OLT and the OMCI VNF network occurs.

Some embodiments of the present disclosure will be further illustrated with reference to the drawings.

Figure 1:
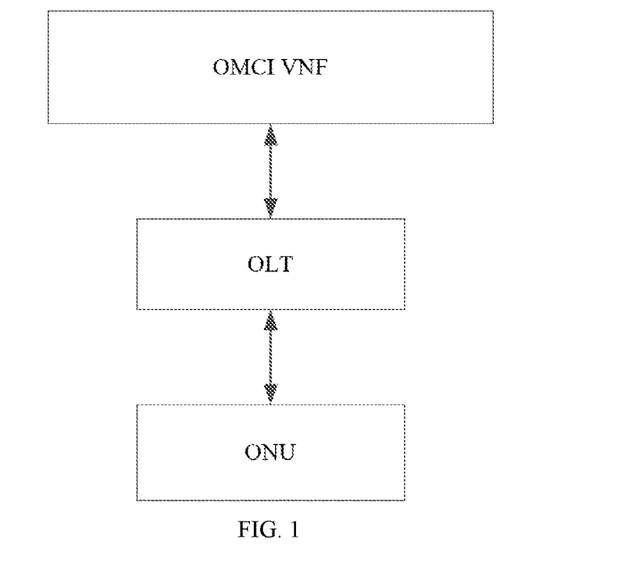
FIG. 1 depicts a schematic diagram showing an architecture of a passive optical fiber network based on VNF.

FIG. 1 depicts a schematic diagram showing an architecture of a passive optical fiber network based on VNF. As can be seen from FIG. 1, the passive optical fiber network based on VNF includes three parts, i.e., an optical line terminal (OLT), one or more optical network units (ONUs), and an optical network unit management control interface virtualization network function (OMCI VNF). The ONU and the OMCI VNF are remotely connected with the OLT through a network. The OMCI VNF sends the service management instruction to the OLT. Then the OLT transmits the service to each ONU to realize the service management of the ONU(s).

Figure 2:
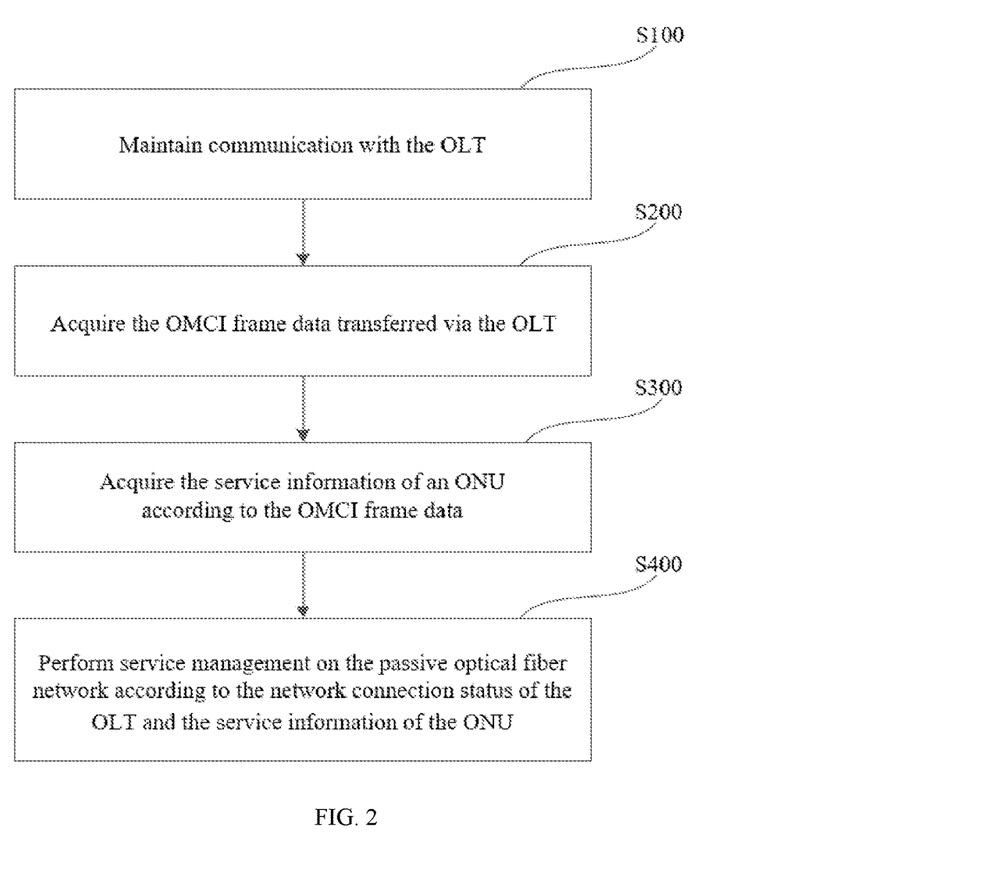
FIG. 2 depicts a flow chart showing a method for service management of a passive optical fiber network according to an embodiment of the present disclosure.

An embodiment of the present disclosure provides a method for service management of a passive optical fiber network. FIG. 2 depicts a schematic flow chart showing a method for service management of a passive optical fiber network according to an embodiment of the present disclosure. The method at least includes the following operations.

At S100, communication with the OLT is maintained.

In this embodiment, the component that maintains the connection with the OLT can maintain the communication with the internal module(s) of the OLT. In another embodiment, the component is provided external to the OLT, but is locally connected to the OLT.

At S200, the OMCI frame data transferred via the OLT is acquired.

In some embodiments of the present disclosure, the OLT is configured to transfer the management information the OMCI VNF sends, to each ONU and to upload the user information acquired by each ONU. The data transmitted through OMCI is frame data, which includes the information transmitted between each OLT and ONU.

At S300, the service information of an ONU is acquired according to the OMCI frame data.

There are many types of service information of ONU, such as registration information, security information, configuration information, and status information. In this embodiment, the service information includes service configuration information and service status information of each ONU.

At S400, service management is performed on the passive optical fiber network according to the network connection status of the OLT and the service information of the ONU.

The service of ONU will fail, when the network status between the OLT and the OMCI VNF changes, such as the change to disconnection status from the normal connection status or restoring the normal connection status from the disconnection status.

Therefore, in this embodiment, the network connection status of the OLT is determined first, and the service management of the passive optical fiber network is performed according to the particular network connection status, in conjunction with the service information of the ONU obtained at S300. The service management includes the service management of the ONU side or the OMCI VNF side.

When the network operates improperly or the network status changes, the method for service management of the passive optical fiber network according to this embodiment can temporarily take over tasks of the OMCI VNF or the ONU to ensure the proper performance of the service of the ONU.

Figure 3:
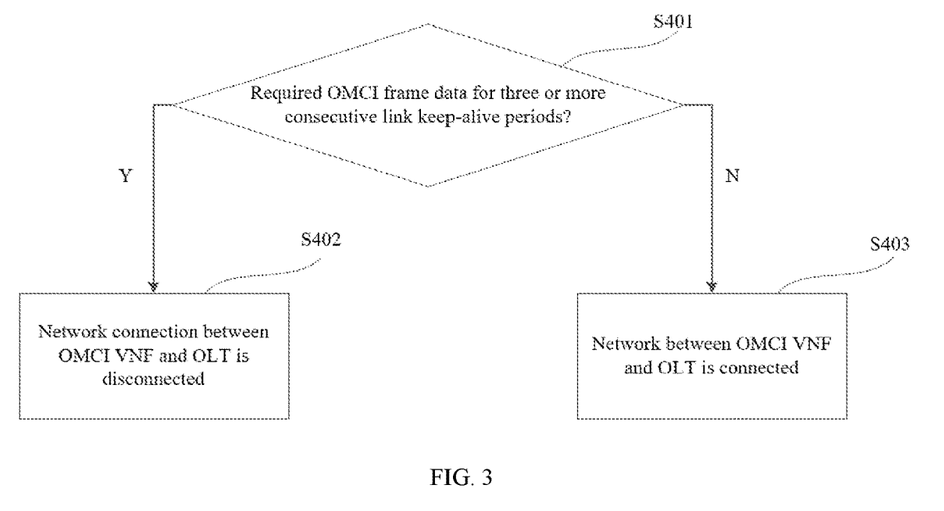
FIG. 3 depicts a schematic diagram showing a procedure of a determination of a network connection state according to an embodiment of the present disclosure.

In an embodiment, a method for determining the network connection status according to the time threshold is provided. As shown in FIG. 3, the method at least includes the following operations.

At S401, a determination is performed as to whether the OMCI frame data is acquired for two or more consecutive link keep-alive periods.

In this embodiment, it is assumed that the duration of three link keep-alive periods is selected as the time threshold for determining the network status, and the duration of each link keep-alive period is 3 seconds. That is, the determination as to whether the OMCI frame data is not acquired within 9 seconds.

At S402, it is determined that the network connection between OMCI VNF and OLT is disconnected, in response to a positive determination.

At S403, it is determined that the network connection between OMCI VNF and OLT is connected, in response to a negative determination at S401.

It shall be appreciated by those having ordinary skills in the art that taking the link keep-alive period as the time threshold for the determination is described only by way of an example, and other methods such as directly setting the time threshold for determination can be applied as an embodiment of the present disclosure.

Figure 4:
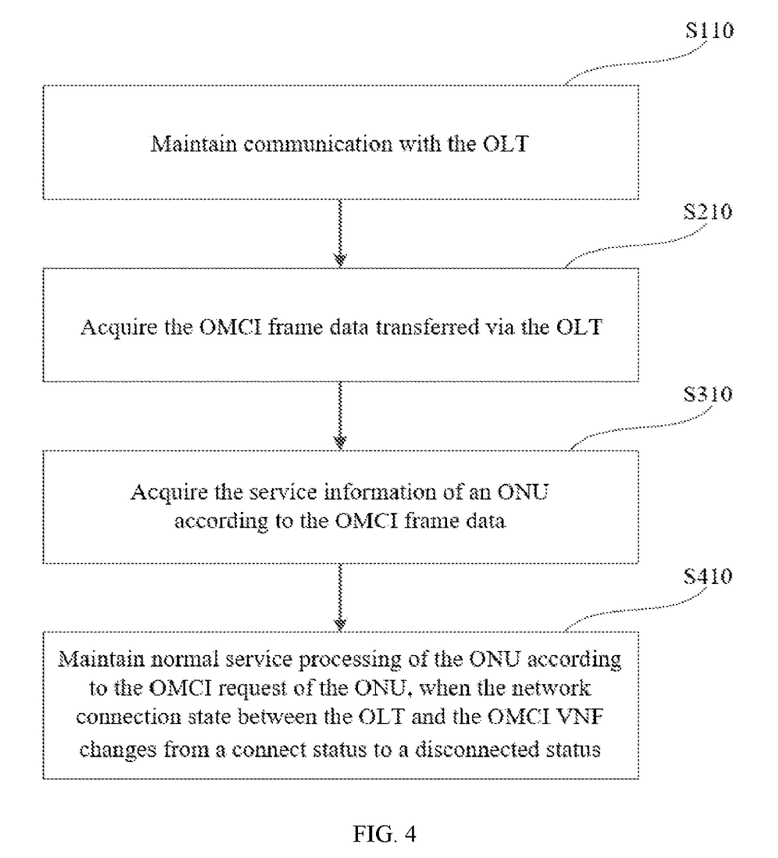
FIG. 4 depicts a flow chart showing a method for service management of a passive optical fiber network performed when the network disconnects according to an embodiment of the present disclosure.

FIG. 4 depicts a flow chart showing a method for service management of a passive optical fiber network performed when the network disconnects according to an embodiment of the present disclosure. The method at least includes the following operations.

At S110, connection with the OLT is maintained.

In this embodiment, the module maintaining communication with the OLT is provided external to the OLT and maintains the local connection with the OLT.

At S210, the OMCI frame data transferred via the OLT is acquired.

At S310, the service information of an ONU is acquired according to the OMCI frame data.

In this embodiment, the service configuration information and service status information of each ONU is acquired by parsing the OMCI frame data. It is well known to those having ordinary skills in the art that, the definition of OMCI frame data, the definition of management entity (ME) and the data information contained therein, and the relationship between different MEs are described in the standard ITU-T G.988 "ONU Management and Control Interface (OMCI) Specification", which will not be repeated here.

At S410, normal service processing of the ONU is maintained according to the OMCI request of the ONU, when the network connection state between the OLT and the OMCI VNF changes from a connect status to a disconnected status.

In this embodiment, when the network connection state between the OLT and the OMCI VNF changes from a connection status to a disconnection status, the OMCI VNF cannot manage the ONU through the OLT. At this time, the passive optical fiber network service management device provided external to the OLT maintains the proper service processing of the ONU according to the OMCI request of the ONU.

In particular, the passive optical fiber network service management device responds to the OMCI request of the ONU instead of the OMCI VNF to maintain the proper performance of the service of the ONU.

Figure 5:
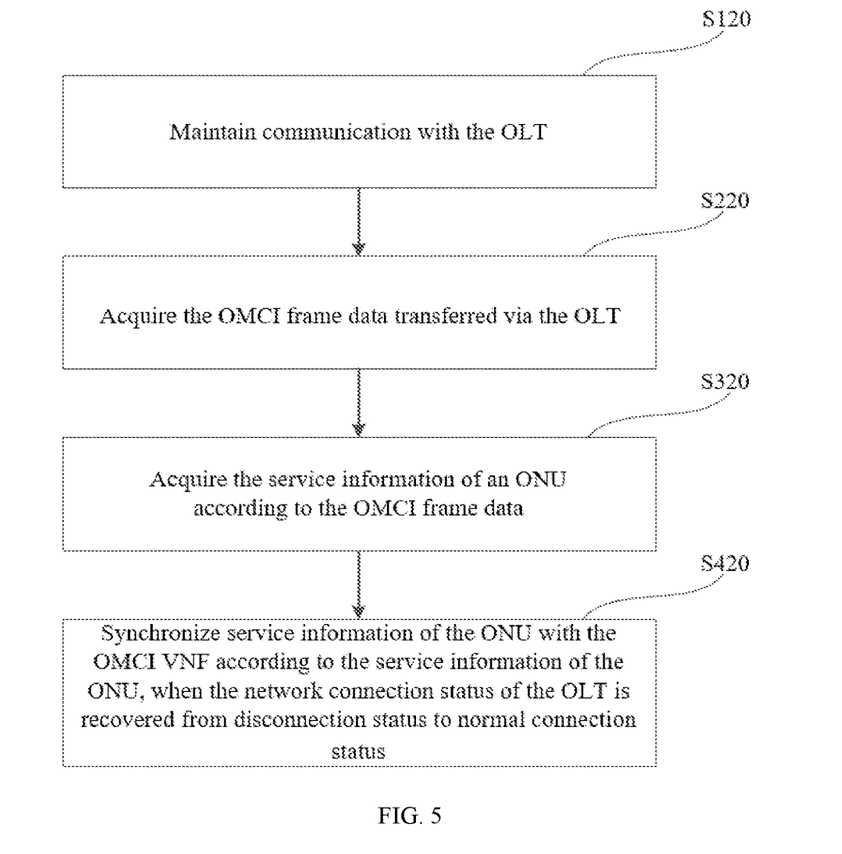
FIG. 5 depicts a flow chart showing a method for service management of a passive optical fiber network performed when the network disconnects according to another embodiment of the present disclosure.

FIG. 5 depicts a flow chart showing a method for service management of a passive optical fiber network performed when the network disconnects according to another embodiment of the present disclosure. The method at least includes the following operations.

At S120, communication with the OLT is maintained.

In this embodiment, the module that maintains the communication with the OLT is provided inside the OLT as a functional module and maintains the local connection with the OLT.

At S220, the OMCI frame data transmitted via the OLT is acquired.

At S320, the service information of an ONU is acquired according to the OMCI frame data.

In this embodiment, the service configuration information and service status information of each ONU is acquired by parsing the OMCI frame data. It is well known to those having ordinary skills in the art that, the definition of OMCI frame data, the definition of management entity (ME) and the data information contained therein, and the relationship between different MEs are described in the standard ITU-T G.988 "ONU Management and Control Interface (OMCI) Specification", which will not be repeated here.

At S420, service information of the ONU is synchronized with the OMCI VNF according to the service information of the ONU, when the network connection status of the OLT is recovered from disconnection status to normal connection status.

In this embodiment, when the network connection status of the OLT is recovered from disconnection status to normal connection status, it is necessary to perform service information synchronization with the OMCI VNF to promptly update and synchronize the ONU state during the network disconnection without interfering with the normal operation of the ONU.

In case a new OMCI request from ONU appears when the synchronization and update are completed or when the synchronization and update are not completed, it is necessary to make a different processing strategy for the above OMCI request. The determination and processing strategy is shown in FIG. 6 which depicts a schematic flow chart showing a procedure of the determination for the status of the service information synchronization.

Figure 6:
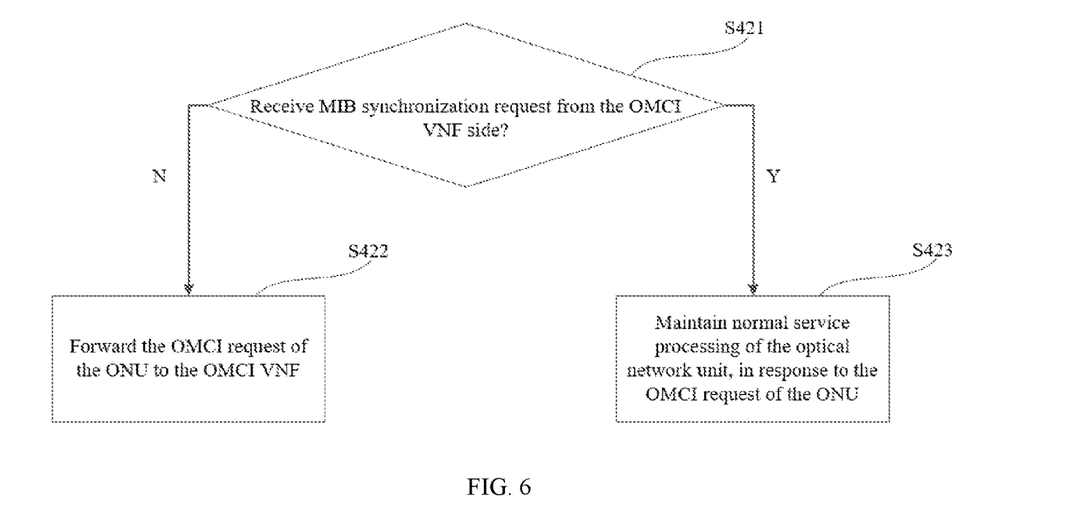
FIG. 6 depicts a schematic flow chart showing a procedure of the determination for the status of the service information synchronization according to an embodiment of the present disclosure.

FIG. 6 depicts a schematic flow chart showing a procedure of the determination for the status of the service information synchronization according to an embodiment of the present disclosure. The procedure at least includes the following operations.

At S421, a determination as to whether the management information base (MIB) synchronization request is received from the OMCI VNF side.

In this embodiment, the determination of the service information synchronization status is performed on the basis that the network status changes from the disconnection status to the normal connection status. The completion of the service information synchronization can be determined, and the response subject of the subsequent OMCI request can be identified, by determining whether the device for service management of the passive optical fiber network can still receive the MIB synchronization request from the OMCI VNF side.

At S422, the OMCI request of the ONU is forwarded to the OMCI VNF, in response to a negative determination.

In this embodiment, if the service information synchronization is completed, it is indicated that the OMCI VNF is properly connected with the OLT, and has obtained the ONU status information during the network disconnection. Therefore, the OMCI VNF takes over the device for service management of the passive optical fiber network as the responder of the subsequent OMCI request to process the ONU service. That is, the OMCI request of the ONU will be directly forwarded to the OMCI VNF by the device for service management of the passive optical fiber network.

At S423, the normal service processing of the optical network unit is maintained, according to the OMCI request of the ONU, in response to a positive determination.

In this embodiment, when the service information synchronization is not completed, the service processing may be abnormal if the request is directly forwarded to the OMCI VNF because the OMCI VNF has not completed the state synchronization, even if the OMCI VNF is properly connected to the OLT. In such a case, the device for service management of the passive optical fiber network still takes over the processing.

By determining whether the MIB synchronization request is received from the OMCI VNF side, the synchronization status of OMCI VNF service information can be identified. Thereby, the effective processing of the OMCI request from ONU in the subsequent operation is ensured, and the abnormal service processing caused by incomplete synchronization is avoided. The service processing is transferred to the OMCI VNF after the synchronization is completed, which can also improve the service management efficiency of the passive optical network.

Figure 7:
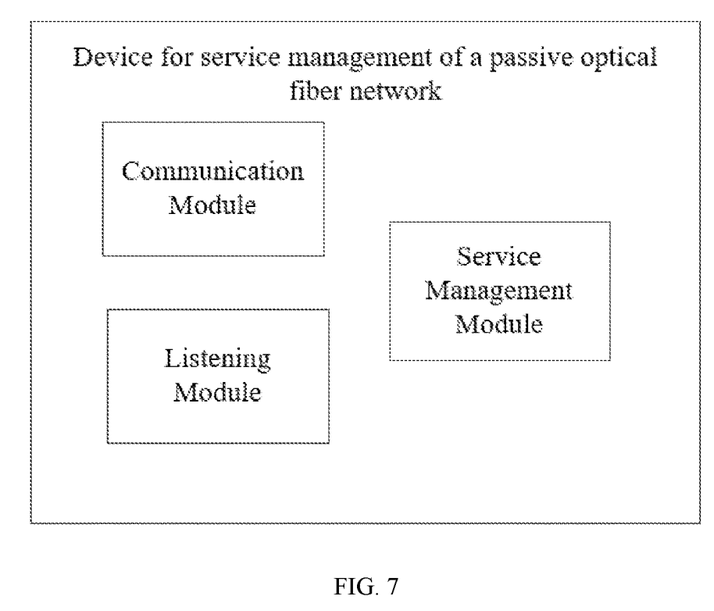
FIG. 7 depicts a schematic diagram showing a device for service management of a passive optical fiber network according to an embodiment of the present disclosure.

An embodiment of the present disclosure provides a device for service management of a passive optical fiber network. As shown in FIG. 7, the device includes, a communication module configured to maintain communication with an optical line terminal (OLT); a listening module configured to acquire optical network unit management control interface (OMCI) frame data transmitted via the OLT, and acquire service information of an optical network unit (ONU) according to the OMCI frame data; and a service management module configured to perform service management to the passive optical fiber network according to a network connection status between the OLT and an optical network unit management control interface for realizing a virtualization network function (OMCI VNF) and service information of the ONU.

In some embodiments, when the network connection status of the OLT is disconnected, the service management module performs service management to the ONU according to the service information of the ONU. The service management includes maintaining by the service management module, the normal service processing of the ONU according to the OMCI request of the ONU.

In some embodiments, when the network connection status of the OLT returns to normal from disconnection, the service management module synchronizes the service information of the ONU with OMCI VNF according to the service information of the ONU.

In some embodiments, when the synchronization of the service information of the ONU with the OMCI VNF is completed, the service management module forwards the OMCI request of the ONU to the OMCI VNF. And then the service management is performed by the OMCI VNF.

In some embodiments, when the synchronization of the service information of the ONU with the OMCI VNF is not completed, the service management module maintains the normal service management of the optical network unit according to the OMCI request of the ONU.

Figure 8:
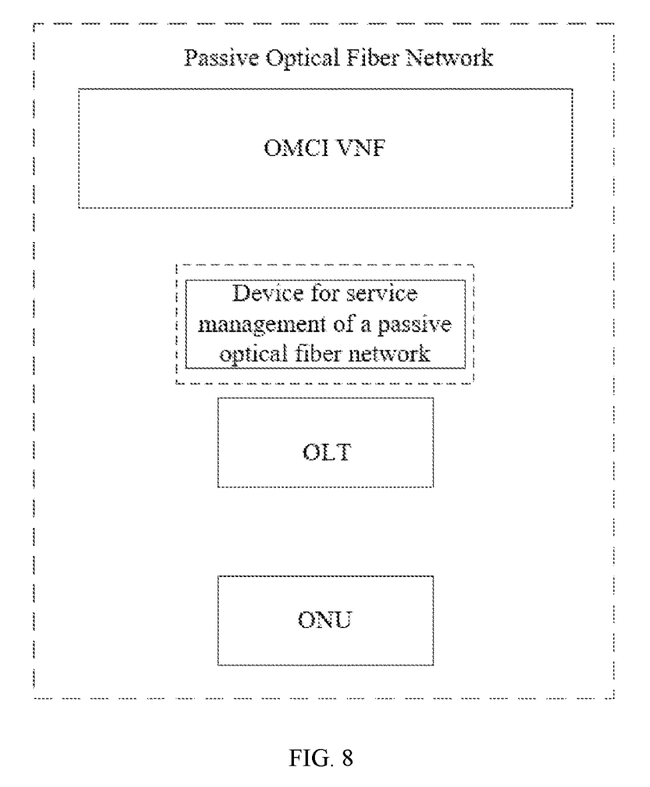
FIG. 8 depicts a schematic diagram showing an architecture of a passive optical fiber network according to an embodiment of the present disclosure.

In some embodiments, as shown in FIG. 8, the device for service management of the passive optical fiber network is independent provided external to the OLT, but locally connected with the OLT. Thus, the network connection status of the device will not be affected by the network connection status between the OMCI VNF and the OLT. The device is arranged between the OLT and the OMCI VNF, and replaces the OMCI VNF to manage the services of the ONU when the network is disconnected. And when the network returns to normal, the device takes over the ONU to perform update and synchronization with the OMCI VNF until the synchronization is completed, hands over the service management to the OMCI VNF, and transitions to the listening mode.

Figure 9:
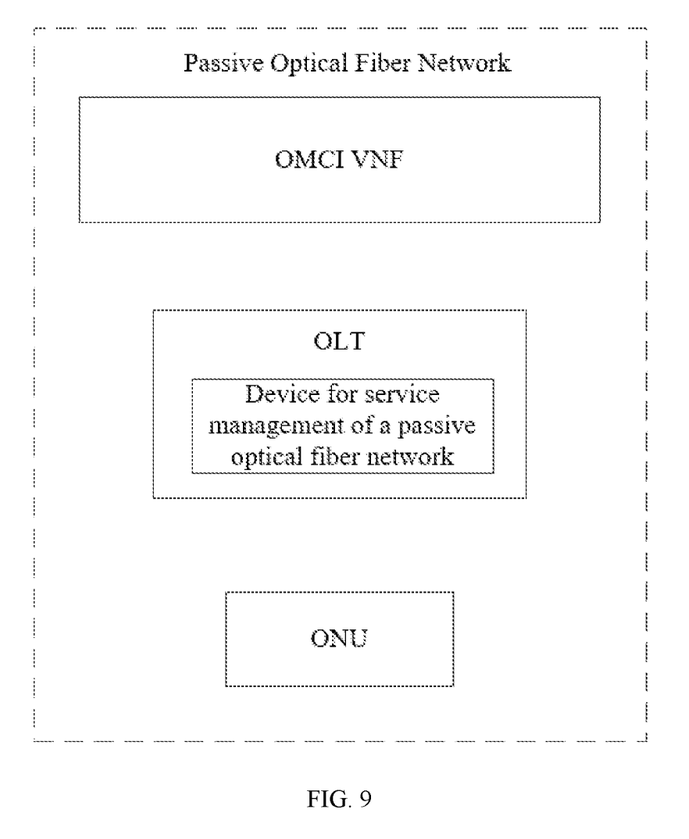
FIG. 9 depicts a schematic diagram showing an architecture of a passive optical fiber network according to another embodiment of the present disclosure.

In some embodiments, as shown in FIG. 9, the device for service management of the passive optical fiber network is provided within the OLT as a built-in component of the OLT. Thus, the communication of the device with the OLT will not be affected by the network connection status between the OLT and the OMCI VNF. The device is arranged between the OLT and the OMCI VNF, and takes over the OMCI VNF to manage of the services of the ONU when the network is disconnected. And when the network returns to normal, the device takes over the ONU to perform update and synchronization with the OMCI VNF until the synchronization is completed, hands over the service management to the OMCI VNF, and transitions to the listening mode.

An embodiment of the present disclosure further provides an optical line terminal, which at least includes the device for service management of the passive optical fiber network as described above.

An embodiment of the present disclosure further provides a computer-readable storage medium storing thereon a computer-executable instruction which, when executed by a processor, causes the processor to carry out the method as described above.

Provided are a method and device for service management of a passive optical fiber network, an optical line terminal, and a storage medium in some embodiments of the present disclosure. By means of some embodiments of the present disclosure, the communication with the OLT is maintained, the OMCI frame data transmitted through the OLT is acquired, the service information of the ONU is acquired according to the OMCI frame data, and the service management of passive optical fiber network is performed according to the network connection status of the OLT and the service information of the ONU. The proper services of the passive optical network can be maintained by temporarily taking over the tasks of the OMCI VNF or the ONU, when a network disconnection between the OLT and the OMCI VNF network occurs.

It shall be appreciated by a person having ordinary skills in the art that all or some of the steps, functional modules/units in the methods, systems and devices disclosed above can be implemented as software, firmware, hardware and their appropriate combinations.

In the hardware implementation, the division between functional modules/units mentioned in the above description does not necessarily correspond to the division of physical components. For example, a physical component may have multiple functions, or a function or step may be performed by several physical components in cooperation. Some or all physical components can be implemented as software executed by a processor, such as a central processing unit, a digital signal processor or a microprocessor, or as hardware, or as an integrated circuit, such as an application-specific integrated circuit. Such software can be distributed on computer-readable media, which can include computer storage media (or non-transitory media) and communication media (or transitory media). As is well known to a person having ordinary skills in the art, the term computer storage medium includes volatile and nonvolatile, removable and non-removable medium implemented in any method or technology for storing information such as computer-readable instructions, data structures, program modules or other data. Computer storage medium include, but are not limited to, RAM, ROM, EEPROM, flash memory or other memory technologies, CD-ROM, digital versatile disks (DVD) or other optical disk storage, magnetic boxes, tapes, magnetic disk storage or other magnetic storage devices, or any other medium that can be used to store desired information and accessible by a computer. Furthermore, it is well known to those having ordinary skills in the art that communication media usually contains computer-readable instructions, data structures, program modules or other data in modulated data signals such as carrier waves or other transmission mechanisms, and can include any information delivery media.

Some embodiments of the present disclosure are illustrated above in conjunction with the drawings, and the present disclosure is not limited thereto. Any modifications, equivalents, alternations, or improvements, made within the scope of the present disclosure shall be included in the scope of the present disclosure.

What is claimed is:

1. A method for service management of a passive optical fiber network comprising an optical line terminal (OLT), an optical network unit (ONU) and an optical network unit management control interface for realizing a virtualization network function (OMCI VNF), the method comprising,
   maintaining communication with the OLT;
   acquiring optical network unit management control interface (OMCI) frame data transferred via the OLT;
   acquiring service information of the ONU according to the OMCI frame data; and
   performing the service management to the passive optical fiber network according to a network connection status between the OLT and the OMCI VNF, and service information of the ONU;
   wherein, performing the service management to the passive optical fiber network according to a network connection status between the OLT and the OMCI VNF and service information of the ONU, comprises,
   performing a synchronization of the service information of the ONU with the OMCI VNF, according to the service information of the ONU, in response to a recovery of network status from disconnected status to connected status, between the OLT and the OMCI VNF.

2. The method of claim 1, wherein, performing the service management to the passive optical fiber network according to a network connection status between the OLT and the OMCI VNF, and service information of the ONU, comprises,
   performing service management to the ONU according to the service information of the ONU, in response to a disconnection between the OLT and the OMCI VNF.

3. The method of claim 2, wherein, performing the service management to the ONU comprises,
   maintaining normal service processing of the ONU, according to an OMCI request from the ONU.

4. The method of claim 1, wherein, forwarding an OMCI request from the ONU to the OMCI VNF, in response to a completion of the synchronization of the service information of the ONU with the OMCI VNF.

5. The method of claim 1, wherein, maintaining normal service processing for the ONU, according to an OMCI request of the ONU, in response to an incompletion of the synchronization of the service information of the ONU with the OMCI VNF.

6. The method of claim 1, wherein, determining the status of the network to be a disconnected status in response to a failure of receiving the OMCI frame data transferred via the OLT within a time threshold; or
   determining the status of the network to be a connected status in response to a reception of the OMCI frame data transferred via the OLT within the time threshold.

7. The method of claim 1, wherein the service information of the ONU comprises service configuration information and service status information.

8. The method of claim 2, wherein the service information of the ONU comprises service configuration information and service status information.

9. The method of claim 3, wherein the service information of the ONU comprises service configuration information and service status information.

10. The method of claim 1, wherein the service information of the ONU comprises service configuration information and service status information.

11. A device for service management of a passive optical fiber network, comprising, a processor and a memory storing at least one program which, when executed by the processor, causes the processor to carry out a method for service management of a passive optical fiber network comprising an optical line terminal (OLT), an optical network unit (ONU) and an optical network unit management control interface for realizing a virtualization network function (OMCI VNF), the method comprising,
    maintaining communication with the OLT;
    acquiring optical network unit management control interface (OMCI) frame data transferred via the OLT;
    acquiring service information of the ONU according to the OMCI frame data; and
    performing the service management to the passive optical fiber network according to a network connection status between the OLT and the OMCI VNF, and service information of the ONU;
    wherein, performing the service management to the passive optical fiber network according to a network connection status between the OLT and the OMCI VNF and service information of the ONU, comprises,
    performing a synchronization of the service information of the ONU with the OMCI VNF, according to the service information of the ONU, in response to a recovery of network status from disconnected status to connected status, between the OLT and the OMCI VNF.

12. A non-transitory computer-readable storage medium storing thereon at least one program executable by at least one processor which, when executed by the processor, causes the processor to carry out a method for service management of a passive optical fiber network comprising an optical line terminal (OLT), an optical network unit (ONU) and an optical network unit management control interface for realizing a virtualization network function (OMCI VNF), the method comprising,
    maintaining communication with the OLT;
    acquiring optical network unit management control interface (OMCI) frame data transferred via the OLT;
    acquiring service information of the ONU according to the OMCI frame data; and
    performing the service management to the passive optical fiber network according to a network connection status between the OLT and the OMCI VNF, and service information of the ONU;
    wherein, performing the service management to the passive optical fiber network according to a network connection status between the OLT and the OMCI VNF and service information of the ONU, comprises, performing a synchronization of the service information of the ONU with the OMCI VNF, according to the service information of the ONU, in response to a recovery of network status from disconnected status to connected status, between the OLT and the OMCI VNF.

13. The non-transitory computer-readable storage medium of claim 12, wherein, performing the service management to the passive optical fiber network according to a network connection status between the OLT and the OMCI VNF, and service information of the ONU, comprises, performing service management to the ONU according to the service information of the ONU, in response to a disconnection between the OLT and the OMCI VNF.

14. The non-transitory computer-readable storage medium of claim 13, wherein, performing the service management to the ONU comprises, maintaining normal service processing of the ONU, according to an OMCI request from the ONU.

15. The non-transitory computer-readable storage medium of claim 12, wherein, forwarding an OMCI request from the ONU to the OMCI VNF, in response to a completion of the synchronization of the service information of the ONU with the OMCI VNF.

16. The non-transitory computer-readable storage medium of claim 12, wherein, maintaining normal service processing for the ONU, according to an OMCI request of the ONU, in response to an incompletion of the synchronization of the service information of the ONU with the OMCI VNF.

17. The non-transitory computer-readable storage medium of claim 12, wherein, determining the status of the network to be a disconnected status in response to a failure of receiving the OMCI frame data transferred via the OLT within a time threshold; or determining the status of the network to be a connected status in response to a reception of the OMCI frame data transferred via the OLT within the time threshold.

18. The non-transitory computer-readable storage medium of claim 12, wherein the service information of the ONU comprises service configuration information and service status information.

* * * * *